F. HACHMANN.
PERCOLATOR.
APPLICATION FILED MAR. 6, 1917.

1,290,546.

Patented Jan. 7, 1919.

Inventor:
FREDERICK HACHMANN,
By John N. Bruninga
His Attorney.

UNITED STATES PATENT OFFICE.

FREDERICK HACHMANN, OF ST. LOUIS, MISSOURI, ASSSIGNOR OF ONE-HALF TO FRED C. SCHOENTHALER, OF ST. LOUIS, MISSOURI.

PERCOLATOR.

1,290,546.  Specification of Letters Patent.  Patented Jan. 7, 1919.

Application filed March 6, 1917. Serial No. 152,839.

*To all whom it may concern:*

Be it known that I, FREDERICK HACHMANN, a citizen of the United States, and residing at St. Louis, in the State of Missouri, have invented a certain new and useful Improvement in Percolators, of which the following is a specification.

This invention relates to coffee percolators of the type adapted for use with an ordinary pot or vessel, and embodies in its general organization a holder or container for ground coffee, a steam generating chamber provided therebeneath, and a percolator tube or duct leading from said chamber and arranged for delivering steam and water downward over the coffee grounds within the container.

When in use, percolators of this type, as heretofore constructed, the point of discharge of the percolator tube remains fixed or constant with respect to the inlet point thereof, and, therefore, variable with respect to the water level, this variation in the point of discharge above the water level being consonant with variations in the quantity of water introduced into the pot. In such prior structure in order to change the point of discharge of the percolator tube the device had to be handled and one portion of the device manually moved with respect to the other and heretofore no means have been provided for automatically varying the point of discharge without handling the device.

In the operation of such devices, pressure developed in the generating chamber forces water, or water and steam, upward through the percolating tube for delivery onto the coffee ground within the container, and, inasmuch as the degree of temperature at which an effective pressure may be obtained varies in accordance with variations in the point of discharge above the water level, it follows that prior constructions, wherein the point of discharge above the water level varies with the quantity of water, are open to the objection that either a maximum quantity of water must be used at all times in order to obtain low temperature efficiency, or else the temperature of the water must be raised in correspondingly increasing ratio as the quantity of water is decreased. Under the latter conditions the quality and flavor of the resultant infusion is inferior to that produced when percolation begins at low temperature.

This invention has among its objects, therefore, to overcome the objection common to prior devices by providing a percolator wherein when being used the point of discharge of the tube above the water level is automatically caused to remain constant or uniform irrespective of variations in the quantity of water used.

A further object of the invention is to provide for the automatic adjustment or regulation of the point of discharge of the tube relative to the water level, whereby percolation at low temperature is obtained at all times, regardless of the amount of water used.

With these and other objects in view, the invention comprises the novel features of construction and combination of parts more fully hereinafter described.

Figure 1:
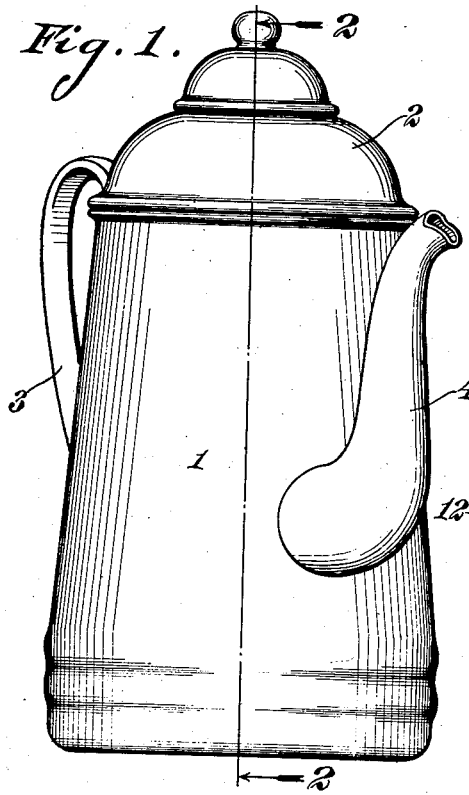
Figure 1 is a view in elevation of a pot equipped with a percolator embodying the invention.
Figure 3:
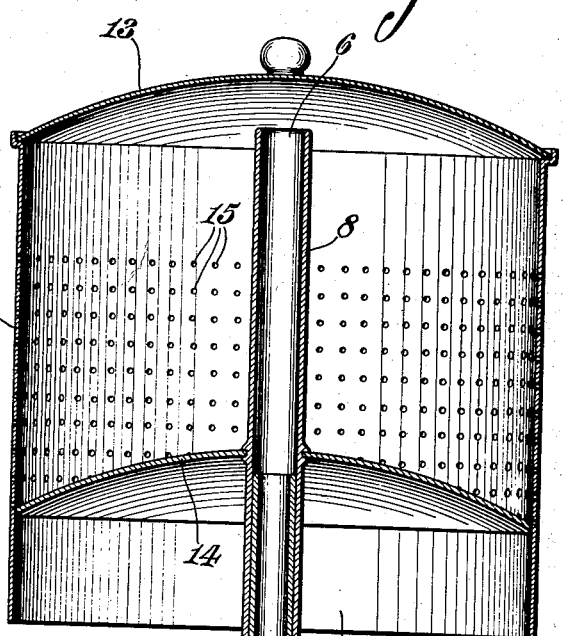

Referring to the drawings, it will be seen that the percolating apparatus forming the subject-matter of the invention, is shown applied for use with an ordinary pot or vessel 1, of any appropriate form, construction and material, and provided, as usual, with a lid or cover 2, a handle 3, and a spout 4.

The improved percolating apparatus, which is removably arranged within the vessel 1, comprises a vertically disposed percolating tube having an inlet 5 and an outlet, or point of discharge, 6, and composed of two sections 7 and 8, telescopically arranged, as shown, for lengthwise adjustment to vary the length of the tube, that is, the distance between the inlet and discharge points, as and for the purpose more fully hereinafter explained, there being affixed to the lower end of the tube a dome shaped partition 9 adapted to rest upon, and coöperate with, the bottom of the vessel 1, to form an inclosed generating chamber 10, having communication with the tube through the inlet 5, and with the interior of the vessel through the medium of suitable openings or ports 11.

Fixed upon, and for vertical movement with, the upper tube section 8 is a ground coffee holder or container 12, equipped with a removable cover 13 and having an upwardly arched, imperforate bottom 14, through which the upper section of the tube projects centrally and upwardly through the container, with its upper discharge end, 6 terminating immediately beneath the cover 13, adapting the water and steam flowing upwardly through the tube to be discharged downwardly upon and over the contents of the holder 12. The side walls of the holder, which are intimately perforated, as at 15, above the bottom 14, depend below the latter in the form of an imperforate marginal apron forming, in conjunction with said bottom, a downwardly opening air space or chamber 16 adapted to hold a quantity of air sufficient to impart buoyancy to the container, whereby the latter operates as a float for automatically controlling the movements of the tube section 8 and maintaining the discharge point 6 constant with respect to the water level $x$, irrespective of the amount of water introduced into the vessel 1.

Figure 2:
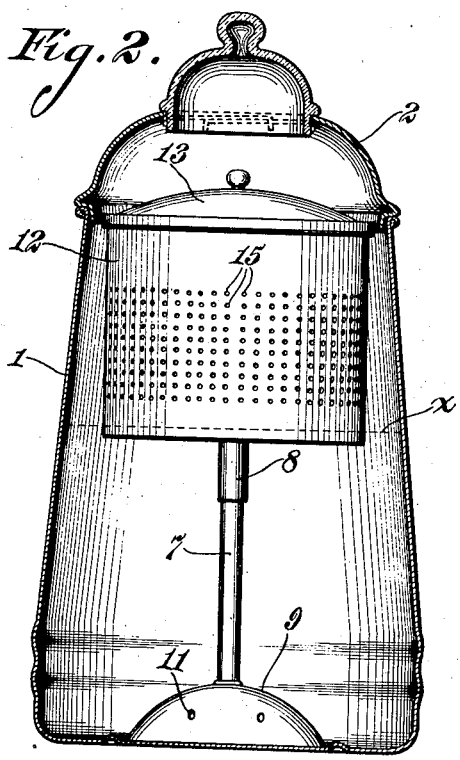
Fig. 2 is a section through the pot, taken on the line 2—2 of Fig. 1, showing the percolator therein in elevation; and, Fig. 3 is an enlarged view, in section, of the percolator.

In practice the percolating apparatus will be arranged in the pot or vessel, as in Fig. 2, a quantity of ground coffee placed in the container 12, and a proportionate amount of water introduced into the vessel, the amounts of coffee and water used being suitably apportioned, as usual, according to the desired strength of the infusion to be obtained. The water, upon entering the vessel, flows through ports 11 into the generating chamber 10, where, under the action of the heat to which the vessel is subjected, it develops, within the chamber, an amount of pressure sufficient to force the water (or water and steam) upward through the tube for delivery at the discharge point 6 onto the coffee within the container, in the manner heretofore explained, and as is usual in the operation of such devices. Inasmuch, however, as the rapidity with which an effective pressure will be developed, and, therefore, the temperature to which the water must be raised in order to obtain such pressure, depends upon the active height of the discharge point 6 above the water level $x$, it follows that, to obtain at all times an effective pressure at low temperature, the point 6 must remain uniform or constant with respect to the water level, regardless of the amount of water used.

In the further operation of the apparatus herein disclosed, and which is an embodiment of one means for maintaining the discharge point uniform with respect to the water level, the container 12, which, as before explained, is constructed and arranged to act as a float for sustaining the upper tube section 8, will, upon introduction of the water into the vessel, automatically adjust itself to the level of the water, and, in doing so, carries the tube section 8 upward or downward, as the case may be, upon the companion section 7, thereby automatically lengthening or shortening the tube to accord with the quantity of water used. It is to be particularly noted that, as a result of this automatic adjustment of the tube, the height of the point 6 above the water level remains the same at all times, and that, therefore, the requisite pressure to establish flow of water through the tube will be developed in the chamber 10 at a relatively low temperature.

From the foregoing it is apparent that the invention accomplishes its stated objects, and, while the apparatus herein disclosed is believed to be the best for the purpose, it is to be understood that, in attaining the ends in view, the invention is not necessarily restricted to the details herein shown and described, inasmuch as various minor changes may be made therein without departing from the spirit or scope of the invention.

Having thus described the invention, what is claimed is:

1. In a percolating apparatus, percolating means comprising a percolator tube, and means for automatically maintaining the discharge point of said tube constant with respect to the level of the percolating liquid.

2. In a percolating apparatus, percolating means comprising a percolator tube having an inlet and a discharge point, and means for automatically varying the active length of the tube between said points with respect to the amount of percolating liquid used.

3. In a percolating apparatus, percolating means comprising a percolator tube, and means constructed and arranged to automatically vary the length of said tube in accordance with variations in the level of the percolating liquid.

4. In a percolating apparatus, percolating means comprising a percolator tube consisting of a pair of telescopically arranged sections, and means for automatically adjusting said sections relatively for maintaining the point of discharge of said tube constant with respect to the level of the percolating liquid.

5. A device of the class described, comprising a liquid receiving vessel, a coffee container constructed and arranged to float upon the surface of said liquid, and a percolator tube having a longitudinally movable section connected for movement automatically with said container to accord with variation in the level of the liquid.

In testimony whereof I affix my signature this 28 day of February, 1916.

FREDERICK HACHMANN.